(No Model.)
W. B. TAYLOR.
TIRE TIGHTENER.
No. 580,474. Patented Apr. 13, 1897.
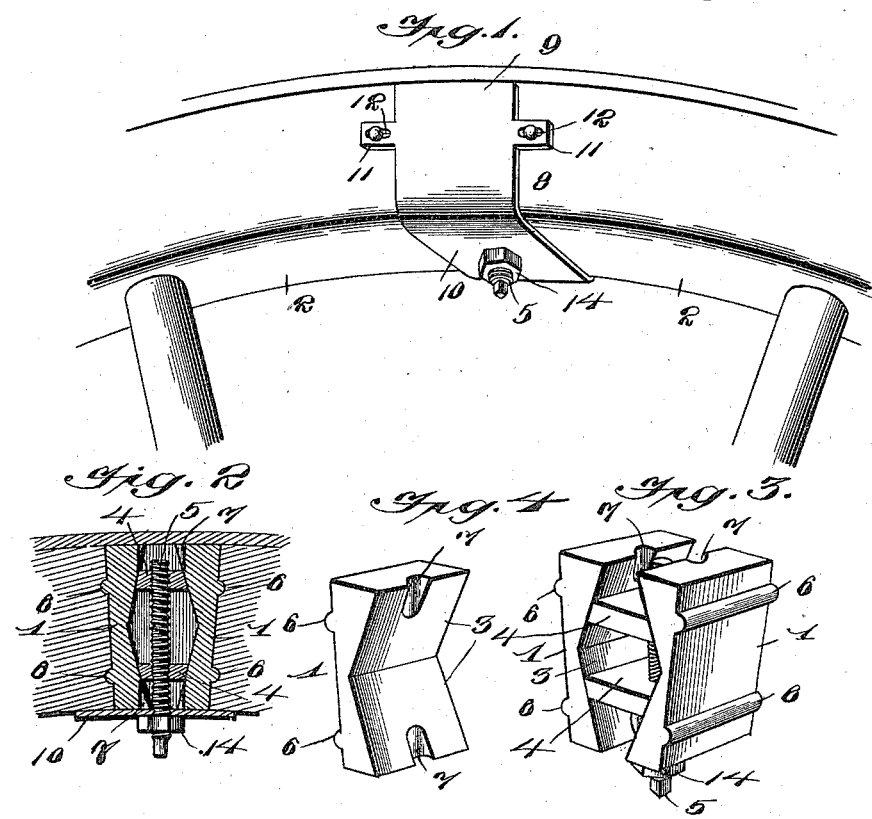
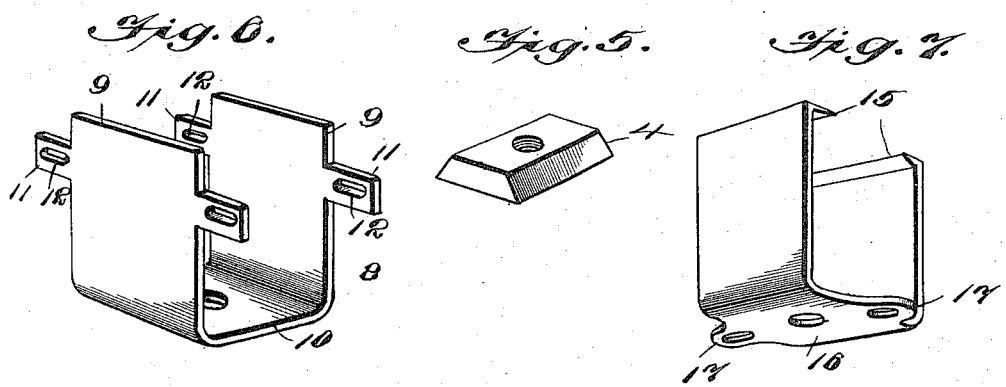
Witnesses
W. J. Koerth.
N. F. Riley
Inventor
William B. Taylor,
By his Attorneys,
C. A. Snow & Co.

UNITED STATES PATENT OFFICE.

WILLIAM BUFORD TAYLOR, OF SAN ANTONIO, TEXAS, ASSIGNOR OF ONE-FOURTH TO JAMES H. NUNN, OF SAME PLACE.

TIRE-TIGHTENER.

SPECIFICATION forming part of Letters Patent No. 580,474, dated April 13, 1897.

Application filed July 14, 1896. Serial No. 599,141. (No model.)

*To all whom it may concern:*

Be it known that I, WILLIAM BUFORD TAYLOR, a citizen of the United States, residing at San Antonio, in the county of Bexar and State of Texas, have invented a new and useful Tire-Tightener, of which the following is a specification.

The invention relates to improvements in tire-tighteners.

The object of the present invention is to improve the construction of tire-tighteners and to provide a simple, inexpensive, and efficient device adapted to be readily applied to an ordinary vehicle-wheel without removing the tire, fellies, or spokes, and capable of ready adjustment to expand or contract the fellies to tighten the parts in dry weather, to prevent the wheels from becoming loose when the woodwork shrinks, and also to permit the parts to expand in wet or damp weather to prevent the wheel from becoming dished when the woodwork swells.

The invention consists in the construction and novel combination and arrangement of parts hereinafter fully described, illustrated in the accompanying drawings, and pointed out in the claims hereto appended.

In the drawings, Figure 1 is a perspective view of a portion of a wheel provided with a tire-tightener constructed in accordance with this invention. Fig. 2 is a sectional view taken transversely of the rim of the wheel. Fig. 3 is a detail perspective view of the adjustable plates and the wedges. Fig. 4 is a detail perspective view of one of the adjustable plates. Fig. 5 is a similar view of one of the wedges. Fig. 6 is a detail perspective view of the casing. Fig. 7 is a detail perspective view illustrating a modification of the casing.

Like numerals of reference designate corresponding parts in all the figures of the drawings.

1 1 designate a pair of adjustable plates interposed between the adjacent ends of fellies 2 and having their opposed faces 3 converging inward and outward from the centers of the plates and adapted to be engaged by wedges 4, located between the inner and outer portions of the plates 1, and operated by a screw 5, disposed radially with relation to the wheel. The faces 3 and 4, which converge toward the inner and outer edges of the plates 1, are engaged by the tapering or beveled edges of the wedges 4, which are provided with threaded perforations for the reception of the screw, and the latter has right and left hand threads, whereby when it is rotated the wedges are simultaneously moved in opposite directions to loosen the plates 1 to permit the fellies to expand or to force the plates apart to expand the fellies to tighten the parts of the wheel.

The device, which may be readily applied to any ordinary wheel by sawing out a portion of a felly, is provided at the outer faces of the plates 1 with transverse ribs 6, which are arranged in corresponding grooves of the adjacent ends of the fellies.

The inner end of the screw is squared for the reception of a wrench or other suitable tool for rotating it, and the plates 1 are provided at their inner and outer ends with grooves 7, adapted to receive the ends of the screw to permit the plates to be brought close together.

The plates 1 and the wedges 4 are housed within a substantially rectangular casing 8, consisting of parallel sides 9, arranged at the opposite side faces of the fellies, and a connecting portion 10, arranged at the inner faces of the fellies and provided with a central opening through which passes the squared end of the screw 5. The sides 9 of the casing 8 are provided with laterally-disposed lugs or projections 11, having slots 12 disposed longitudinally of the fellies and adapted for the reception of screws, bolts, or other suitable fastening devices for attaching the casing to the wheel, and the slots permit the fellies to move longitudinally when they expand and contract.

In old wheels a packing of any suitable material is interposed between the outer faces of the fellies and the tire, and this packing, which may be readily applied to the wheels, is adapted to prevent the spokes from leaving the fellies.

The adjusting-screw may be provided with a jam-nut 14, arranged to engage the inner connecting portion of the casing to secure the parts at any desired adjustment and to prevent the screw from accidentally rotating.

In Fig. 7 of the accompanying drawings is illustrated a modification of the casing in which the sides of the casing are provided at their outer ends with inwardly-extending lips 15, which are beveled, and they are adapted to be interposed between a tire and the outer faces of the fellies, and the inner connecting portion 16 of the casing is provided at its top edges with extensions or ears 17, having slots disposed longitudinally of the fellies and adapted to receive the fastening devices for securing the casing to them. The slots, as before explained, permit the necessary movement of the fellies in adjusting the parts of the wheel.

It will be seen that the tire-tightener is exceedingly simple and inexpensive in construction, that it may be readily applied to ordinary vehicle-wheels without removing the tire, fellies, and spokes, and that it is capable of tightening the parts to prevent them from becoming loose in dry weather when the wood shrinks and of permitting the parts to expand in wet weather when the wood swells to prevent a wheel from becoming dished. Furthermore, it will be apparent that the felly is not weakened by the tire-tightener and that there is comparatively little space between the outer ends of the adjustable plates, owing to the arrangement of the oppositely-converging faces 3.

Changes in the form, proportion, and minor details of construction may be resorted to without departing from the principle or sacrificing any of the advantages of this invention.

What I claim is—

1. In a tire-tightener, the combination of a pair of adjustable plates adapted to be interposed between fellies and provided with inner faces converging from the center of the plates to the inner and outer ends thereof, a pair of reversely-arranged wedges interposed between the plates and engaging the converging faces thereof, and an adjusting-screw having right and left hand threads engaging the plates and adapted to move them simultaneously in opposite directions, substantially as and for the purpose described.

2. In a tire-tightener, the combination of a pair of adjustable plates adapted to be interposed between fellies and having their opposed faces converging from the center to their inner and outer ends, a pair of reversely-arranged wedges interposed between the plates and engaging the converging faces thereof, and means for moving the wedges to and from each other simultaneously, substantially as and for the purpose described.

3. In a tire-tightener, the combination of a pair of adjustable plates provided at their outer faces with transverse ribs to engage fellies, and having their inner opposed faces converging from their centers to their inner and outer ends, said plates being provided at their inner and outer ends with grooves, the reversely-arranged wedges interposed between the adjustable plates and provided with threaded openings, and an adjusting-screw having right and left hand threads engaging the wedges, substantially as and for the purpose described.

4. In a tire-tightener, the combination of a substantially rectangular casing, adapted to embrace the adjacent fellies of a wheel and provided with slots disposed longitudinally of the fellies, adjustable plates arranged within the casing and provided with oppositely-converging inner faces, a pair of reversely-arranged wedges interposed between the plates, and an adjusting-screw engaging and operating the wedges, substantially as described.

In testimony that I claim the foregoing as my own I have hereto affixed my signature in the presence of two witnesses.

WILLIAM BUFORD TAYLOR.

Witnesses:
ANTONIO D. FLORES,
CHARLES E. ROSS.